United States Patent [19]

Park

[11] 4,360,574
[45] Nov. 23, 1982

[54] HIGH-TEMPERATURE STORAGE BATTERY

[75] Inventor: Young W. Park, Seoul, Rep. of Korea

[73] Assignee: Korea Institute of Science and Technology, Seoul, Rep. of Korea

[21] Appl. No.: 258,037

[22] Filed: Apr. 27, 1981

[30] Foreign Application Priority Data

May 22, 1980 [KR] Rep. of Korea ............... 1990/80[U]

[51] Int. Cl.³ ............................................. H01M 4/00
[52] U.S. Cl. ..................................... 429/94; 429/103; 429/112
[58] Field of Search ........................... 429/112, 94, 103

[56] References Cited

U.S. PATENT DOCUMENTS

| 3,829,330 | 8/1974 | Dey ................................. 429/194 X |
| 4,053,690 | 10/1977 | Backlund ........................... 429/112 |
| 4,123,597 | 10/1978 | Zauner et al. ...................... 429/112 |
| 4,154,905 | 5/1979 | Urry .................................. 429/94 |
| 4,164,608 | 8/1979 | Coetzer ........................... 429/112 X |
| 4,246,325 | 1/1981 | Hatch .............................. 429/112 X |
| 4,275,129 | 6/1981 | Koppus et al. ..................... 429/112 |
| 4,287,271 | 9/1981 | Coetzer et al. ................. 429/112 X |

Primary Examiner—Charles F. Lefevour
Attorney, Agent, or Firm—Holman & Stern

[57] ABSTRACT

A tubular high-temperature storage cell is provided. This cell comprises a central rod electrode of one polarity and a second electrode which encases said central electrode. Between both electrodes, a large separator is interposed. One electrical terminal from the central rod electrode is provided at the center of the cell top through a feedthrough sleeve. The opposite terminal is welded directly to the cell container can or to the cell top lid. The cell container itself also can act as a current collector.

5 Claims, 3 Drawing Figures

HIGH-TEMPERATURE STORAGE BATTERY

FIELD OF THE INVENTION

This invention relates to a high-temperature storage battery, more particularly to a storage battery that can be employed as a power source for electric vehicles and/or as device for storage of excess electrical power in non-high-demand intervals.

BACKGROUND OF THE INVENTION

In general, the designation "high-temperature storage battery" refers to a battery which is capable of operating in high temperature environments, for instance, at temperatures above the melting point of the electrolyte contained therein. It has been found that various high-temperature batteries can be manufactured using varied combinations of various materials for electrode, separators, and/or electrolytes. Among the high-temperature storage batteries hitherto proposed, those expected to be most active, with respect to performance and utility, are those which employ an alkali or alkali earth metal or an alloy of one of those metals with another more stable metal as an active material for the negative electrode, a metal sulfide and oxide as an active material for the positive electrode, and molten salts containing at least one of the above alkali or alkali earth metal ions. In those batteries, for example, lithium, sodium or calcium, or an alloy of one of those metals with aluminum or silicone is used as an active material for the negative electrode, and iron sulfide, copper sulfide, nickel sulfide, cobalt sulfide or a combination of those sulfides is employed as an active material for the positive electrode. However, it is important to understand that the performance characteristics of a battery, such as its life cycle, energy and power, greatly demands upon the structure of the battery. Thus, various batteries having different structures have been developed to data.

Many prior art attempts have been made to improve battery structure. For example, in U.S. Pat. No. 3,887,396 issued on Nov. 15, 1973, there is proposed a battery of a button type configuration, the height of which is much lower than the diameter. The electrodes installed in the battery have the shape of disc plates and are horizontally assembled by interposing a separator between the positive and negative electrodes. However, in this battery, an electrode terminal must extend outward from one of the electrodes and, therefore such a battery requires a complex electrode structure.

U.S. Pat. No. 3,933,520 granted to E. C. Gay and F. J. Martino on Apr. 3, 1975, discloses a method of preparing electrodes for use in a high-temperature battery. The method comprises first preparing a structure of reticulated or porous current collectors in the shape of an electrode and then distributing electrode active materials into said structures. However, batteries using the electrodes thus prepared, due to protruded points of the current collector, are apt to be damaged during operation.

Another U.S. Pat. No. 3,933,521 to D. R. Vissers and B. J. Tani, issued Jan. 20, 1976, has proposed an electrode structure wherein metallic fiber is compacted into a current collector made of metallic screen and a molten alkali metal is placed into the interstitial crevices of the metallic fiber. In the electrode design, both sides of the collector are used to increase the surface area of the current collector. However, in general, molten alkali metals are highly corrosive and, therefore, many problems are encountered in the selection of anti-corrosive materials, particularly in their mechanical stability in response to impact.

Similarly, J. C. Hall has proposed, in his U.S. Pat. No. 4,003,735 issued Jan. 18, 1977, an electrode, which was provided by compacing an active material into a tetragonal, pentagonal, circular, or honeycomb-like current collector structure so that the material can be retained in the collector. A battery using such an electrode also has some commercialization problems due to its complicated structure and difficulties in evenly compacting the active materials onto the surface of the electrode. In addition, U.S. Pat. No. 4,029,860 to D. R. Vissers, et al., discloses an electrode structure constructed by attaching reticulated or parallel band-shaped small structures to the whole area of current collectors; electrode active materials are compacted therebetween. A battery employing this electrode also has similar drawbacks as in Hall's electrode mentioned above. A battery using a refractory material, i.e. woven oxides or nitrides, as a separator which is inserted between electrodes (See: *Progress Report for the Period*, Argonne National Laboratory—78-74, Oct. 1977—Sep. 1978, and Development of Lithium-metal Sulfide Batteries, EPRI EM-176, Interim Report, June, 1978) or using magnesium oxide power as a separator substitute (See: Extended Abstracts Electrochem. Soc. Meeting, Pittsburgh PA, Oct. 15-20, 78(2), 418, 1978) is under active development. For instance, for a lithium-iron sulfide battery, cloths made of a boron nitride or ytrium oxide, or nonwoven fabrics are used; however, since it is difficult to obtain a woven fabric from the above nitride or oxide, and since the material itself is expensive, the use of the material is not desirable in view of economy of manufacture. As a substitute for the highly expensive material, pulverized magnesium oxide having desirable properties of hear-resistance and chemical resistance has therefore been increasingly used; however, since the separator layer of the powder is apt to be broken in the structure of a quadrilateral or cylindrical battery, it is not easy to apply the powder separator technique for actual battery production.

Additional difficulties encountered in conventional battery design are due to the fact that since a plurality of current collectors of the flat plate, honeycomb or network types must be arranged in parallel for each group of positive and negative electrodes connected in the cell and each terminal post from the group of connected positive and negative electrodes should be extended out of the cell, the connected points tend to break off.

From the foregoing, it can be concluded that conventional batteries can be manufactured to provide high-performance characteristics with high-energy and high-power density. With respect to reliability and cost, however, it will be understood that there are still many problems to be solved in order to obtain practical batteries.

Furthermore, in a battery employing a certain conventional electrode structure, increased amounts of materials are required which do not take part in the electrode reaction, thereby causing increased battery weight and reduced energy density of the battery.

SUMMARY OF THE INVENTION

It is, therefore, an object of the present invention to provide a new high-temperature cell structure exhibiting performance wherein the aforementioned problems of conventional batteries are eliminated.

It is also an object of the invention to provide a simple high-temperature cell structure wherein the weight of current collectors is light and the separator material has high reliability and high-energy density.

It is further object of this invention to provide a new structure of high-temperature cells wherein positive and/or negative electrode terminals are integrally mounted on the upper edge of the cell can.

These and other objects will be attained by a cell in accordance with the present invention which comprises a tubular outer cell housing; active materials for each of the positive and the negative electrodes, said materials each being formed in rod and tubular form and concentrically disposed inwardly from said cell housing; and a tubular separator disposed between said positive and negative materials.

In accordance with the invention, since the cell is designed in tubular form, the electrode structure can be simple; thereby, the process of manufacturing the electrode can be simplified. Therefore, it is also possible to produce a high-energy density battery by eliminating the weight of complicated current collectors.

Since sharp edges also are not formed in the cell, breakage can be reduced. In addition, the use of pulverized separator material is possible, resulting in considerably cost reduction. Furthermore, the components of the cell are compacted thereinto symmetrically with respect to the central axis of the cell and, therefore, the active electrode materials are stable when mechanical impacts are applied thereto. Therefore, it is possible to prevent internal short circuits due to the broken electrode particles.

BRIEF DESCRIPTION OF THE DRAWINGS

The present invention is in detail illustrated in the accompanying drawings, wherein.

DESCRIPTION OF THE PREFERRED EMBODIMENT

Figure 1:
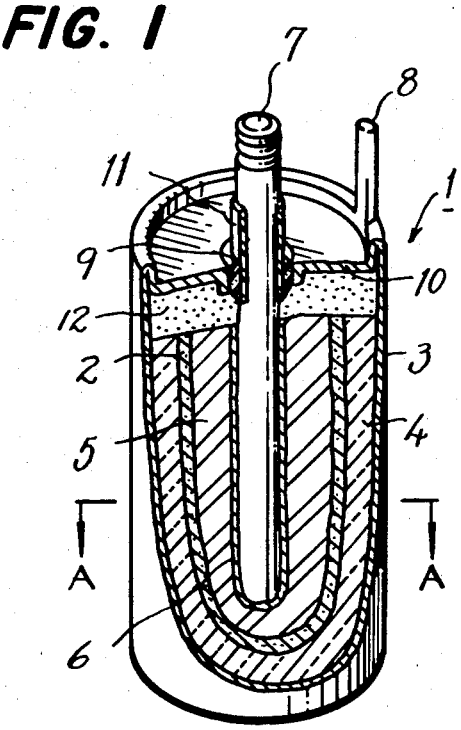
FIG. 1 is a perspective view in cross-section of the cell structure in accordance with the present invention.
Figure 3:
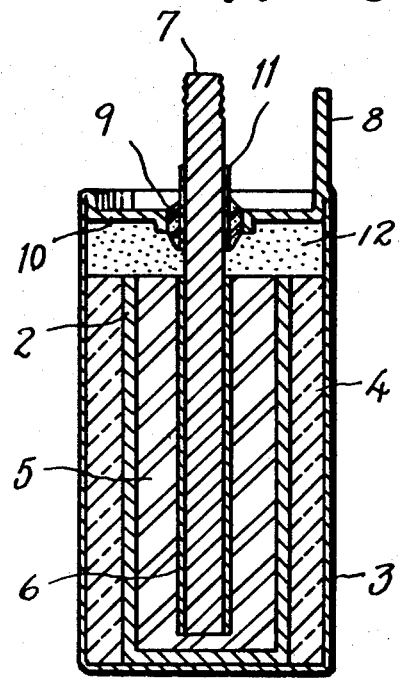
FIG. 3 is a longitudinal cross-sectional view of the cell shown in FIG. 1.
Figure 2:
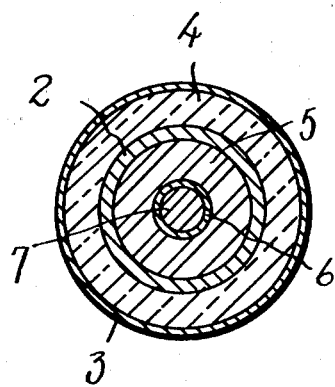
FIG. 2 is a sectional view taken along the line A—A of FIG. 1.

Referring now to FIGS. 1 to 3, cell 1 is constituted by disposing a tubular separator 2 within a tubular cell housing 3, inserting a positive material (such as a positive electrode) 4 between separator 2 and cell housing 3, and positioning a negative material (such as a negative electrode) 5 between separator 2 and a hollow, tubular current collector 6 which is located at the central axis position within the separator. A rod-like negative electrode terminal 7 is inserted into collector 6. After the cell is assembled and the peripheral circumference of a coil lid 10 is joined to the inner wall of cell housing 3, a positive electrode terminal 8 is welded to the upper edge of the assembled cell. The negative terminal 7 can be directly connected to the active material for the negative electrode 5 to be integral with the collector 6; or, as aforementioned, terminal 7 can be connected by merely inserting it into the collector 6. The negative electrode terminal 7 extends upwardly through a feedthrough sleeve 11 and is electrically insulated from lid 10 by means of an appropriate insulator 9. Housing 3, which contacts the active material for positive electrode 4, acts as both a combined cell housing and a positive current collector. The separator 2 prevents electronic conduction between the negative and positive electrodes; however, it permits ionic conduction therebetween.

In an embodiment in accordance with the present invention, there has been proposed a cell, wherein a negative electrode 5 is positioned at the central part of the cell and a positive electrode 4 is arranged outside of the negative electrode via a separator 2 interposed between both electrodes; however, the opposite arrangement of the electrodes is also possible. In other words, it may be possible to dispose the positive electrode at the central part within the cell and the negative electrode at the outside of the positive electrode within the cell. In such a case, the polarity of the cell terminals is changed with respect to one another. One of the electrodes can be manufactured by either a conventional press pelleting technique or an extrusion technique using a proper die. Depending upon the mode of the extrusion employed, it can be made in a continuous step. The extruded electrode is cut to a desired length to be instantly used in assembling the cell. Since the capacity of an electrode is a function of its length once its diameter is fixed, electrodes having various capacity can be prepared by a single extrusion.

Returning again to FIGS. 1 to 3, the structure of the cell in accordance with the invention has no spatial gap in the cell 1, except for the annular disc-shaped gap 12 defined in the upper portion of the cell. Thus, it is quite possible to retain the original form of the electrodes 4 and 5 which are made by simple pressure-forming of the active materials, and the active material powder has a smaller chance to break off than in conventional batteries composed of flat-type electrodes.

Commonly, in high-temperature batteries, a metal chalcogenide is employed as an active material for the positive electrode; however, since its electrical conductivity is lower than that of the metal, the surface area of the current collector in the positive electrode occasionally affects the performance of the battery. In the tubular cell of the present invention, the cell housing 3 can serve as a current collector. Since housing 3 has a greater surface area, it is preferred to employ the outside electrode, which contacts with cell housing 3, as a positive electrode.

The feedthrough sleeve 11 located at the central portion of lid 10 consists of a tube which is made of the same materials as the terminal 7 and which is fitted to the lid 10 via insulating material 9, for example, special ceramic or frit. Terminal 7 passes upward through sleeve 11.

In the present invention, as previously mentioned, a conventionally known metal chalcogenide is employed as an active material for the positive electrode 4 and an alkali or alkali earth metal, or an alloy of the metals is employed as an active material for the negative electrode. A molten salt, i.e. a eutectic composition, containing an ion or ions of the alkali or alkali earth metal such as LiCl-KCl, is employed as an electrolyte.

The preferred embodiment of the invention is described in connection with tubular or cylindrical electrodes and binary electrode cell structures, although it should be understood that the electrodes can be replaced by prism-like tubular or a rectangular type of electrodes and multi-electrode structures.

In the upper gap 12, a powder mixture of magnesia and boron nitride, or boron nitride powder alone is filled. Poor wettability of those materials with the molten electrolyte salt can reduce the corrosion of the parts around the feedthrough sleeve 11. In this way, frequent failure of battery operation, due to formation of a short circuit around the feedthrough sleeve by corrosion products, can be prevented.

This invention will be further illustrated by means of a specific example as hereinafter described. In order to prepare a high-temperature battery of 90 WH capacity according to the invention, the following designs are presented.

| Positive electrode (4): | |
|---|---|
| active material: | FeS; 140.5 grams |
| salts: | LiCl—KCl; 90 grams |
| inner diameter: | 29.8 mm |
| outer diameter: | 36.2 mm |
| height: | 200.2 mm |
| Negative electrode (5): | |
| active material: | Li—Al (48 atom % Li); 139 grams |
| electrode diameter: | 23.0 mm |
| height: | 200.0 mm |
| current collector diameter: | 6.0 mm |
| terminal diameter: | 4.0 mm |

The cell is maintained at a temperature of about 400°–450° C. so that the electrolyte salt, LiCl-KCl contained in the cell is completely melted, and the activity of the positive and the negative electrode materials is maintained.

Under these cell conditions, the electrode reaction of the cell is illustrated by the following equation:

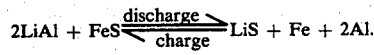

$$2\text{LiAl} + \text{FeS} \underset{\text{charge}}{\overset{\text{discharge}}{\rightleftarrows}} \text{LiS} + \text{Fe} + 2\text{Al}.$$

When a cell designed according to the above parameters is discharged at 5 amperes, the change of cell voltage with time is obserbed to be as shown in the following table.

| Time (hr) | Voltage (volt) |
|---|---|
| 0 | 1.38 |
| 1 | 1.335 |
| 2 | 1.330 |
| 3 | 1.325 |
| 4 | 1.320 |
| 5 | 1.305 |
| 6 | 1.287 |
| 7 | 1.270 |
| 8 | 1.255 |
| 9 | 1.245 |
| 10 | 1.230 |
| 11 | 1.210 |
| 12 | 1.185 |
| 13 | 1.140 |
| 14 | 1.035 |
| 14.5 | 0.900 |

Also, according to the design mentioned above, a simple product weighing up to 610–615 grams and having energy density of about 142 WH/Kgr. can be produced.

Although a preferred embodiment of the invention has been described herein in detail, it is desired to emphasize that this description is for the purpose of illustrating the principles of the invention and should not necessarily be construed as limiting the invention since it is apparent that those skilled in the art can make many modified arrangements of the invention without departing from the true scope thereof.

What is claimed is:

1. In a high-temperature cell employing an alkali or alkali earth metal or its alloy as a negative electrode, a metal oxide or sulfide as a positive electrode and a molten salt containing said alkali or alkali earth metal ions an an electrolyte, the improvement wherein the cell structure comprises:
   a cylindrical cell housing;
   a cylindrical electrode of a first polarity located within said cell housing, said electrode including a current collector;
   a tubular electrode of a second polarity disposed around said cylindrical electrode at the inside of said cell housing;
   a cylindrical separator positioned between said electrodes;
   a cell lid covering the top of said cell housing, said lid being provided with a feedthrough sleeve; and
   a first solid electrode terminal filling the interior of and circumferentially contacting said cylindrical electrode and extending outwardly of said cell housing through said feedthrough sleeve.

2. The cell structure according to claim 1 wherein a second electrode terminal is mounted on said cell housing.

3. The cell structure according to claims 1 or 2 wherein said feedthrough sleeve is electrically insulated from said cell lid.

4. In a high-temperature cell employing an alkali or alkali earth metal or its alloy as a negative electrode, a metal oxide or sulfide as a positive electrode and a molten salt containing said alkali or alkali earth metal ions as an electrolyte, the improvement wherein the cell structure comprises:
   a cylindrical cell housing;
   a tubular electrode disposed inside said housing and having a cylindrical interior surface;
   a hollow cylindrical electrode disposed concentrically within and spaced from said tubular electrode, said cylindrical electrode having an outer surface and an inner surface;
   hollow cylindrical separator means for permitting ionic condition therethrough and preventing electronic conduction therethrough, said separator means having an inner surface in flush circumferential contact with the outer surface of said cylindrical electrode, said separator means further including an outer surface in flush circumferential contact with said cylindrical interior surface of said tubular electrode;
   a tubular current collector disposed along the inner surface of said cylindrical electrode;
   a solid terminal rod disposed within and in circumferential contact with said current collector; and
   an annular cell lid covering the top of said housing and provided with a feedthrough insulative sleeve through which said terminal rod projects.

5. The cell structure according to claim 4, wherein a second electrode terminal is mounted on said cell housing.

* * * * *